United States Patent Office 3,836,458
Patented Sept. 17, 1974

3,836,458
WATER PURIFICATION MEANS
Craig Wallis and Joseph L. Melnick, Houston, Tex., assignors to The Carborundum Company, Niagara Falls, N.Y.
No Drawing. Continuation-in-part of application Ser. No. 184,190, Sept. 27, 1971, which is a continuation-in-part of application Ser. No. 135,463, Apr. 19, 1971, both now abandoned. This application Apr. 20, 1973, Ser. No. 353,147
Int. Cl. B01d 13/00, 31/00
U.S. Cl. 210—23                    12 Claims

ABSTRACT OF THE DISCLOSURE

A filter system is provided for the purification of water, whereby particulates and viruses may be economically and reliably removed. The system comprises a filter means for removal of silts and colloidal materials, a treated carbon virus filter, and a specially treated honeycomb cartridge for removal of microbiological flora, e.g., bacteria, fungi, molds, and algae one micron or larger. Optionally, the system may include reverse osmosis means, an ion exchange demineralizer, and an ultrafine membrane filter.

Background of the Invention

This is a continuation-in-part of copending application Ser. No. 184,190, filed Sept. 27, 1971, now abandoned, which is in turn a continuation-in-part of application Ser. No. 135,463, filed Apr. 19, 1971, now abandoned.

Previous attempts to remove very small contaminants from fluids such as water have depended upon forcing the fluid, under pressure, through a filter medium. Such conventional techniques have been improved by the use of filter aids. Filter aids, such as diatomaceous earth, perlite, and carbon are coated with various organic compositions. The addition of precoated filter aid particles to a liquid enhances the entrapment of impurities and the formation of a porous filter cake during filtration. These filter aid techniques require the continuous addition of filter aid particles in complex batch processes which require careful control. It has also been suggested to remove colloidal suspensions from air by means of a treated fabric, i.e., by example U.S. Pat. No. 2,818,073.

It has recently been learned that filter media capable of entrapping microorganisms such as viruses may be prepared by treating an adsorbing media such as activated carbon. Such techniques are disclosed in copending applications Ser. Nos. 299,518, filed Oct. 20, 1972, and 341,816, filed Mar. 16, 1973, now U.S. Pat. 3,770,625, issued Nov. 6, 1973 by Wallis and Melnick. In addition, Ser. No. 184,190, filed Sept. 27, 1971, now abandoned, of which this is a continuation-in-part, discloses treatment of fibrous filter materials.

Summary of the Invention

The present invention contemplates a filtration system utilizing fabric filters having enhanced capabilities for removing contaminants from a fluid. The fabric filters utilized may be treated with an inorganic hydrolyzing composition containing sodium. Such a filtration system, utilizing a cellulose acetate fiber filter, effectively removes microbiological flora. By utilizing such a system in conjunction with a virus filtration unit and a reverse osmosis membrane, a liquid such as water may be very highly purified.

Many of the deficiencies of prior art filtration systems are overcome by the present invention. For example, by proper selection of treated filtration elements, one may selectively remove contaminants from a liquid. It is also to be noted that the use of readily available materials, and the relatively high capacities available with the systems described, will make it economically feasible to reclaim large quantities of contaminated or polluted water.

Detailed Description of the Present Invention

The present filtration system utilizes fabric filters treated with an inorganic sodium containing hydrolyzing composition. Preferably, the fabric filters are comprised of glass fibers or cellulose acetate fibers.

The fibers used may be in a variety of forms, including woven and non-woven fibers. Preferably a filter cartridge having a core element on which fabric or fibers are wound in successive layers is employed. In one type of filter cartridge, the fiber is first wound in successive layers in helical convolutions spaced along the core in one direction, and then in the opposite direction in a criss-cross manner. This provides a honeycomb filter cartridge with diamond shaped openings between successive layers. This winding results in passages extending from the outside of the unit to the inside thereof. During the winding of subsequent layers the strands are placed uniformly over the strands of previous layers. The crossing points of the strands may be moved slightly or the distance between fibers decreased, thus causing spaces in successive passages to decrease in size. U.S. Pat. No. 3,398,837 to E. R. Adams is an example of the honeycomb winding that may be used in a filter cartridge employing the treated fabric of the present invention. A non-woven web or a woven web of fabric can be wound spirally around the core in a conventional manner.

The fabric filter is treated with an inorganic hydrolyzing composition of matter containing sodium. The hydrolyzing composition can be contacted with the medium through any system that produces sodium hydroxide. Preferably the hydrolyzing composition is an aqueous solution of sodium hydroxide.

The concentration of sodium hydroxide in the aqueous solution is generally not critical in the treatment of the fabric filter. However, to some extent the contact time is dependent on the concentration of sodium hydroxide. Lower concentrations of sodium hydroxide require an increase in contact time. Preferably the concentration of sodium hydroxide is from about 0.3 to about 3 moles per liter of water.

In treating a cellulose acetate filter fabric, it has been found that various hydrolyzing agents are effective. Effective hydrolyzing agents include inorganic bases and salts such as zinc chloride and alkali hydroxides. Various organic acids and bases such as acetic acid and tetraalkyl-ammonium bases are effective hydrolyzing agents.

Prior to using the filter cartridges in filtering apparatus, the cartridge may be washed with a dilute aqueous solution of an acid to neutralize excess basic hydrolyzing agent. The neutralizing step can be followed by washing and drying. The drying may be accomplished in any conventional manner such as air-drying or moderate heating temperatures in ovens.

The treated fabric filter is contacted with a fluid containing contaminants whereby the contaminants are removed from the fluid. It is known that fabric filters of glass fiber are effective in removing metal insoluble salts and metal complexes, particularly heavy metal such as iron complexes and insoluble salts from an aqueous solution. It is believed that this removal is due to electrostatic adsorption of the metal by the fabric filter. Treatment of glass fiber filter elements with sodium hydroxide makes such elements more avid binders of fine insoluble salts. That is, sodium hydroxide apparently improves the surface of the glass fiber so that it can remove a larger load; adsorbed particles do not slough off the sodium hydroxide treated glass fibers as easily as from untreated fibers, under the surge of water pressure.

The treatment of cellulose acetate with hydrolyzing composition results in a decrease in the porosity of the filter, thereby enhancing the filtration properties of the fabric filter. Such filter units are quite effective in the removal of microbiological flora such as bacteria, fungi, molds, and algae (one micron or larger) from water.

When contaminated water is passed through fabric filters prepared according to the present invention prior to passing through a reverse osmosis filter, the maintenance cost of the reverse osmosis filter is significantly decreased.

In membrane filtration, a portion of the fluid flows through the membrane to give pure water and a remaining portion containing concentrated contaminants is removed as waste. Due to the membrane's preferential sorption of water, most organic molecules, as well as selected salts, particulates, and other materials are rejected by the membrane.

Typical osmotic membranes, such as a cellulose acetate film, have a pore size less than about 0.005 microns and preferably about 0.005 to about 0.002 microns. The pressure across the membrane can vary according to the shape and size of the membrane and the proportion of water passing through the membrane. With more membrane surface or lesser pure water recovered per total water feed, smaller pressure differentials are required. In a typical reverse osmosis unit, a high-pressure feed of water, on the order of about 200 to 600 pounds per square inch is utilized. It has been found that when water is prefiltered through fabric filters prepared in accordance with the present invention the operation of the reverse osmosis unit is greatly improved, and the life of an osmotic membrane increases.

The filtration steps prior to reverse osmosis preferably include passing water through a fabric treated filter of glass to remove insoluble salts and metal complexes and/ or through a treated cellulose acetate fabric filter. The cellulose acetate fabric filter preferably has a porosity less than about 0.5 microns. Organics and viruses are preferably removed prior to the water passing through the reverse osmosis unit by an activated carbon adsorbing media. Preferably the activated carbon medium is upstream of a treated cellulose acetate fabric filter.

Dependent upon specific requirements, based upon the nature of the fluid being filtered, modifications of this basic system are of course possible. For example, where insoluble salts and metal complexes are not a problem, the treated glass fiber filter may be dispensed with. Where water pressures are relatively stable, for example, an untreated glass fiber filter cartridge may be used. Conversely, where it is desirable to prepare water of extremely high purity, one may employ a virus filtering unit prepared in accordance with the teachings of our copending U.S. patent application Ser. No. 299,518, filed October 20, 1972, or Ser. No. 341,816, filed March 16, 1973, now U.S. Pat. 3,770,625, issued Nov. 6, 1973. The virus removing filter comprises an activated carbon adsorbing medium which has been treated to enhance adsorbency. Such treatment may be by contact with a sodium containing inorganic hydrolyzing agent, or with a dilute nitric acid solution. Preferably, the terated activated carbon medium is upstream of a treated cellulose acetate fabric filter. Dependent upon requirements, a great number of various embodiments employing the basic principles of this invention are possible. Further variations include the use of ion exchange units, reverse osmosis membranes, demineralizers, etc.

The following examples are illustrative of the invention, and are not to be limitative thereof.

Example 1

A cellulose acetate filter cartridge (The Carborundum Company, W-39R 10GV), of the type having the fiber wound on to the core in a honeycomb fashion is soaked in about a 1.0 normal aqueous solution of sodium hydroxide. After about 10 minutes of soaking in the aqueous sodium hydroxide, the filter cartridge is removed and washed with a dilute aqueous solution of hydrochloric acid followed by a water wash. The cartridge is air-dried. Water is passed through the treated cartridge at 50 p.s.i. for 20 minutes. The result is compared with the flow rate through the same filter cartridge at 50 p.s.i. for 20 minutes prior to treatment. The flow rate through the treated filter cartridge is 20% less than the flow rate through the untreated filter cartridge. In a similar manner, a cellulose acetate filter cartridge which includes a glass fiber core cover with a honeycomb winding, (The Carborundum Company, W10A porosity $0.5\mu$) is treated with sodium hydroxide and tested for a change in flow rate. The decrease in flow rate as compared to the untreated cartridge was 56%. Similar results are obtained by treating a cellulose acetate filter cartridge with a 1.0 normal aqueous solution of acetic acid for 1 hour.

Example 2

Raw animal serum (Denver Serum Co.) which contained about 7000 bacteria per ml. is passed through the filter cartridge, (W10A) treated with aqueous sodium hydroxide in a manner similar to Example 1. The bacteria in the effluent after passing through the cartridge is undetectable. The entire filtration process is completed within a few minutes. The bacterial counts in the serum before and after filtration are made by inoculating blood agar plates with 0.1 ml. of serially diluted serum, streaking the inoculum with a bacteriological loop, and counting the colonies.

Example 3

Five gallons of tap water is passed through a Millipore membrane (Millipore Company). A red-brown deposit forms on the surface of the membrane. The membrane is connected in series with a sodium hydroxide treated glass fiber filter cartridge (The Carborundum Company K-27 R10S), and tap water is passed through the filter cartridge prior to passing through the membrane. About five gallons of water passes through the filter cartridge and membrane as connected above, and a white-gray deposit forms on the membrane, indicating that the treated filter cartridge has adsorbed the red-brown deposit contained in the water.

Example 4

A water purifying system for processing about 12 gallons of water per hour is constructed. Tap water at a pressure of about 60 p.s.i. enters the system and the water pressure is reduced by means of a valve to about 45 p.s.i. The water passes a pressure gauge and enters a conductivity cell. The tap water of the city of Houston, Tex., contains about 420 parts per million dissolved solids. The water passes through a polyethylene tubing to an activated carbon cartridge treated with sodium hydroxide. The filter cartridge (The Carborundum Company RFS-10) has an inner portion of activated carbon (Pittsburgh GW14x40) and an outer cover of honeycomb wound fiber. The filter cartridges in the system are contained in Fulflo® holders (The Carborundum Company). The water is then passed through two glass fiber (K-27 R10SV) cartridges which have been treated with sodium hydroxide in a manner similar to Example 3. These latter two cartridges include a center core filled with Haas Amberlite resin (IRA-938) which is packed into the center core of the filter cartridge. The resin adsorbs nondegradable phosphates and carbonates. The water then passes through a cellulose acetate filter cartridge (The Carborundum Company W10A) treated in a manner similar to Example 1, so that the filter cartridge has an effective porosity of about 0.25 microns. The water then passes through a reverse osmosis unit. (Osmonics, Inc., rated 250 gal./day) and then through polyethylene tubing into a conductivity cell. At this time the concentration of solids in the water has been reduced to about 19 parts per million dissolved solids. Next, the water passes through a mixed resin bed (Diamond Shamrock Company) which reduces the solids content to about 0.01 parts per million dissolved solids. Analysis of the water obtained from the system has shown dissolved solids in the area of 0.01 to 0.03 parts per million, no detectable chlorides, no detectable organics, and no detectable solids. The water from the system has been used to make media for growth of cultured cells for support of virus growth, and media for growth of bacteriological and other microbiological flora, and has given better results than similar cultures prepared with triple distilled water.

Example 5

The tap water from the city of Houston, Tex. containing 420 parts per million dissolved solids is passed directly throug the reverse osmosis unit of Example 4 without any prefiltration. After five days of filtering at about 250 gallons per day it is necessary to clean the osmosis equipment to remove complexed metal salts bound to the membrane. The unclogging is performed by passing concentrated hydrochloric acid through the system to dissolve the solid complexes. Such cleaning subsequently reduces the life of the membrane. The reverse osmosis equipment as described in Example 4 has been used to prepare about 320 gallons of pure water per day for a period of six months without any clogging or other adverse effects on the osmosis equipment.

Example 6

A water purifying system using filter cartridge holders and connections similar to the system described in Example 4 is constructed. Tap water from the city of Houston, Tex. containing about 420 p.p.m. dissolved solids is first passed through a glass fiber filter cartridge (The Carborundum Company K27 R10S) which has been treated with sodium hydroxide. Next, water is passed through an activated carbon filter cartridge similar to the one described in Example 4. The water is then passed through a second sodium hydroxide treated glass fiber filter cartridge which is interchangeable with the first above-described treated glass fiber cartridge. When the red-brown color builds up on the first cartridge it is replaced by the second glass fiber cartridge which in turn is replaced by a new treated glass fiber filter. Next, the water passes through a cellulose acetate filter cartridge (The Carborundum Company, W10A), which has been treated with sodium hydroxide to reduce the porosity so as to remove bacteria, algae and molds. The water then passes through a reverse osmosis unit and a resin bed as described in Example 4. The final safety filter cartridge is cellulose acetate filter (The Carborundum Company, W10A), which is treated with sodium hydroxide. A water of high purity is obtained which is suitable for preparing bacteria and virus cultures. The reverse osmosis unit exhibits low maintenance.

Although certain embodiments of the invention have been disclosed for the purpose of illustration, it will be evident that various changes, and modifications may be made without departing from the spirit and scope of the invention as described in the appended claims.

What is claimed is:

1. A water purification apparatus comprising an activated carbon filter, a cellulose acetate fiber filter, said cellulose acetate fiber filter treated by a hydrolyzing agent, and a reverse osmosis membrane, wherein said activated carbon is treated to increase virus adsorbency by contact with a composition selected from the group consisting of sodium hydroxide and nitric acid.

2. An apparatus as set forth in claim 1, wherein said cellulose acetate is treated with sodium hydroxide.

3. An apparatus as set forth in claim 1, further comprising a glass fiber filter prior to the activated carbon filter.

4. An apparatus as set forth in claim 3, wherein said glass fiber filter is treated with an inorganic hydrolyzing composition containing sodium.

5. A method for removing contaminants from water comprising filtering the water through an activated carbon filter and a celluose acetate fiber filter, said cellulose acetate fiber filter treated with a hydrolyzing agent, and passing said filtered water through a membrane, wherein said activated carbon filter is treated to increase virus adsorbency by contact with a composition selected from the group consisting of sodium hydroxide and nitric acid.

6. A method as set forth in claim 5 further comprising filtering the water through a glass fiber filter subsequent to filtering it through said activated carbon.

7. A method as set forth in claim 6 wherein said glass fiber filter is treated with sodium hydroxide.

8. A method for purifying water which comprises successively passing said water through a glass fiber filter, an activated carbon filter to remove virsus therefrom, a second glass fiber filter, a cellulose acetate fiber filter treated with a hydrolyzing agent, and a reverse osmosis membrane.

9. A method as set forth in claim 8 wherein at least one of said glass fiber filters is treated with an inorganic hydrolyzing composition containing sodium.

10. A method as set forth in claim 8 wherein said activated carbon is treated to increase virus adsorbency by contact with a composition selected from the group consisting of sodium hydroxide and nitric acid.

11. A method as set forth in claim 10 wherein said hydrolyzing agent is selected from the group consisting of sodium hydroxide and acetic acid.

12. A method as set forth in claim 8 further comprising passing said water through an ion exchange resin.

References Cited
UNITED STATES PATENTS

| | | | |
|---|---|---|---|
| 3,542,199 | 11/1970 | Bray et al. | 210—321 X |
| 2,967,153 | 1/1961 | Houston | 210—506 |
| 2,558,064 | 6/1951 | Steele et al. | 210—500 |
| 3,452,877 | 7/1969 | Mesek et al. | 210—491 |
| 2,834,730 | 5/1958 | Painter, Jr., et al. | 210—504 |

FRANK A. SPEAR, Jr., Primary Examiner

U.S. Cl. X.R.

210—259, 321